(12) United States Patent
McCallum (10) Patent No.: US 11,997,622 B2
(45) Date of Patent: May 28, 2024

(54) SELF-SYNCHRONIZED SENSOR NETWORK

(71) Applicant: Redline Communications Inc., Markham (CA)

(72) Inventor: Ian McCallum, Innisfil (CA)

(73) Assignee: Aviat U.S., Inc., Austin, TX (US)

( * ) Notice: Subject to any disclaimer, the term of this patent is extended or adjusted under 35 U.S.C. 154(b) by 358 days.

(21) Appl. No.: 17/303,838

(22) Filed: Jun. 9, 2021

(65) Prior Publication Data

US 2022/0400450 A1 Dec. 15, 2022

(51) Int. Cl.
*H04W 4/00* (2018.01)
*H04W 4/38* (2018.01)
*H04W 56/00* (2009.01)
*H04W 72/0446* (2023.01)

(52) U.S. Cl.
CPC ........... *H04W 56/001* (2013.01); *H04W 4/38* (2018.02); *H04W 72/0446* (2013.01)

(58) Field of Classification Search
None
See application file for complete search history.

(56) References Cited

U.S. PATENT DOCUMENTS

| | | | |
|---|---|---|---|
| 9,282,515 B2* | 3/2016 | Joo | H04W 52/0229 |
| 9,866,369 B1* | 1/2018 | Haynes | H04L 7/0037 |
| 2011/0134820 A1* | 6/2011 | Lee | A61B 5/0002 370/311 |
| 2016/0286549 A1* | 9/2016 | Abraham | H04W 40/244 |
| 2020/0191943 A1* | 6/2020 | Wu | G01S 13/726 |

* cited by examiner

*Primary Examiner* — Zewdu A Beyen
(74) *Attorney, Agent, or Firm* — Stratford Group Ltd.

(57) ABSTRACT

A self-synchronization sensor system is provided. A self-synchronization sensor system for tracking fast moving assets comprising a plurality of beacons with known coordinates in a tunnel communicating with said plurality of beacons periodically during a synchronization interval and adjusting a beacon interval for each of said plurality of beacons such that one or more beacon messages are transmitted in short time intervals to the plurality of beacons in close proximity. The synchronization interval comprising a plurality of time slots, a first beacon from the plurality of beacons assigned a first time slot from the plurality of time slots within the synchronization interval and launches an origin and a progression of time slot allocation of the plurality of time slots from the origin based on the communication between the plurality of beacons.

12 Claims, 7 Drawing Sheets

SELF-SYNCHRONIZED SENSOR NETWORK

FIELD OF THE INVENTION

The present disclosure relates to a self-synchronized sensor network, particularly to a system for automatically synchronizing the timing of beacons transmissions for improving the accuracy of position calculations for moving assets.

BACKGROUND

In a typical fixed beacon "indoor" Real Time Location System (RTLS), beacons are deployed in a building or other enclosed area, and the assets to be tracked (e.g., people, equipment) are outfitted with beacon gateways. There currently exist accuracy issues with tracking fast moving assets and there is a need for increasing the accuracy of the tracking.

BRIEF SUMMARY

It is the object of the present invention to provide a self-synchronization sensor system. A self-synchronization sensor system for tracking fast moving assets comprising a plurality of beacons with known coordinates in a tunnel communicating with said plurality of beacons periodically during a synchronization interval and adjusting a beacon interval for each of said plurality of beacons such that one or more beacon messages are transmitted in short time intervals to the plurality of beacons in close proximity. The synchronization interval comprising a plurality of time slots, a first beacon from the plurality of beacons assigned a first time slot from the plurality of time slots within the synchronization interval and launches an origin and a progression of time slot allocation of the plurality of time slots from the origin based on the communication between the plurality of beacons.

In accordance with an embodiment of the invention, the plurality of beacons are organized in a 2D triangular pattern.

In accordance with an embodiment of the invention, the plurality of beacons are organized in a 2D rectangular pattern.

In accordance with an embodiment of the invention, the plurality of beacons are organized in a 2D irregular pattern.

In accordance with an embodiment of the invention, the plurality of beacons are organized in a 3D pattern.

In accordance with an embodiment of the invention, the plurality of beacons communicate assignment status.

In accordance with an embodiment of the invention, the plurality of beacons communicate a unique identification number.

In accordance with an embodiment of the invention, the plurality of beacons communicate coordinates.

In accordance with an embodiment of the invention, the plurality of beacons communicate one or more statuses of the plurality of time slots.

In accordance with an embodiment of the invention, two or more of the plurality of beacons may assume a same time slot if collision potential is determined to not be of concern.

In accordance with an embodiment of the invention, the synchronization interval assigns the plurality of time slots based on a proximity of one or more of the plurality of beacons to the origin.

In accordance with an embodiment of the invention, the assignment of the plurality of time slots progresses outward from the origin.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

The proposed invention is a system that utilizes an algorithm to allow beacons to communicate with each other periodically and adjust their beacon timing, so they send beacon message very close in time to their closest neighboring beacons. This allows for beacon gateways to hear all beacons in their immediate vicinity within a few milliseconds instead of requiring an entire beacon interval, significantly improving the accuracy of position calculations for moving assets.

In a typical fixed beacon "indoor" Real Time Location System (RTLS), (FIG. 1) beacons 102 are deployed in a building or other enclosed area, and the assets 104 to be tracked, for example persons and equipment, are outfitted with beacon gateways 106.

Figure 1:
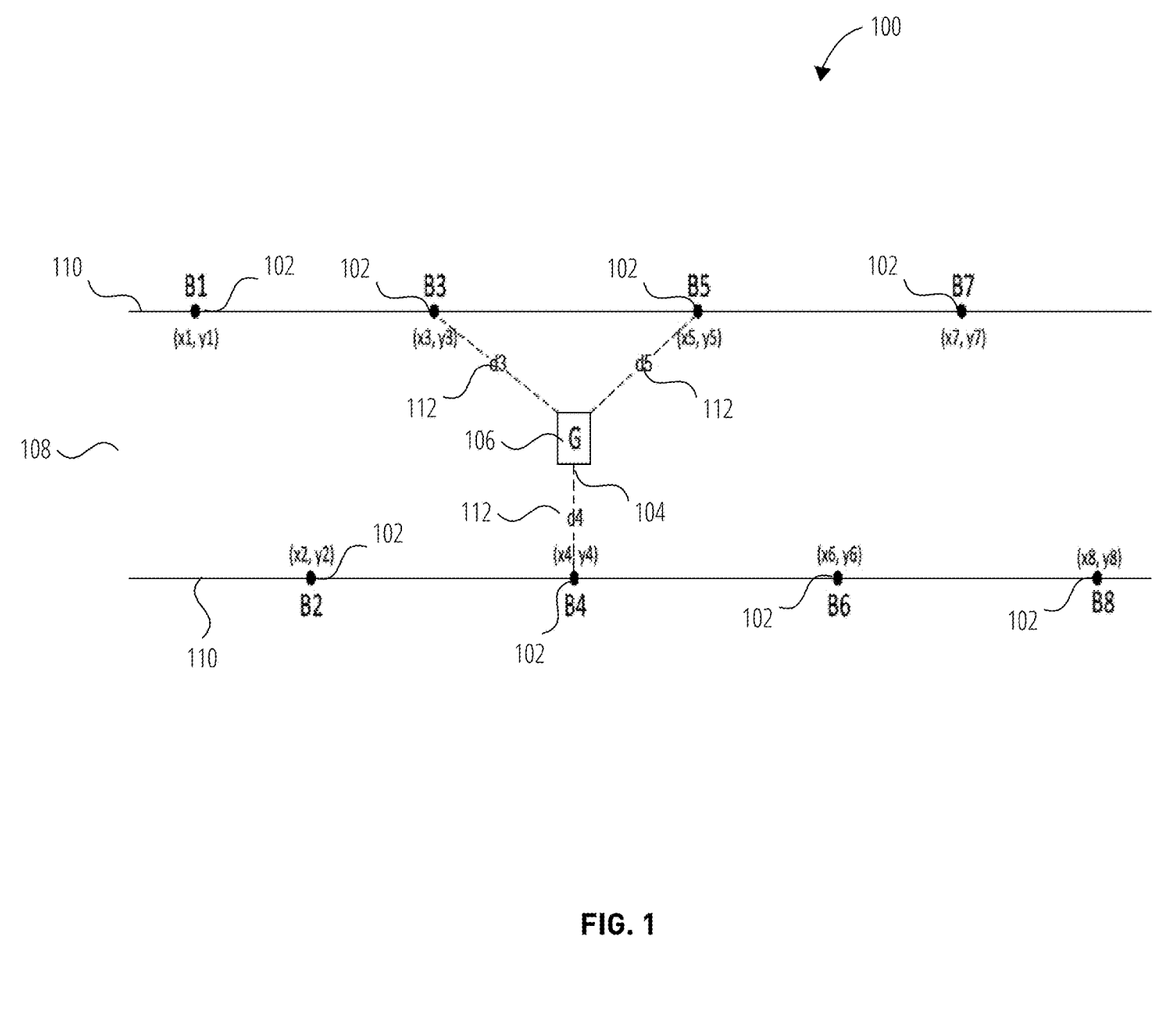
FIG. 1 illustrates an example of a gateway in a tunnel with several beacons 100 in accordance with one embodiment.

A recent application of this technology is in the mining industry, where beacon networks are deployed underground in the mining tunnels 108 and walls 110. Besides tracking people and equipment, mining companies also want to track fast moving assets 104, for example vehicles. The invention presented addresses a problem identified when attempting to track fast moving assets 104 using traditional fixed beacon RTLS networks. As shown in FIG. 1, a tunnel 108 is presented with fixed beacons 102 (B1-B8) installed along both walls 110 of the tunnel 108. The precise locations of the fixed beacons 102 must be known to calculate the locations of the assets 104. The beacon gateway 106 position can be determined using triangular multilateration if the position of at least three fixed beacons 102 (e.g., [x3, y3], [x4, y4], and [x5, y5]) are known, and the distances 112 d3, d4, and d5 can be determined. Although FIG. 1 shows beacons 102 organized in a 2D triangular pattern, other deployment patterns are possible such as, but not limited to, rectangular, irregular and 3D patterns. The only requirement is that beacons 102 need to be mounted on both sides of the tunnel 108, beacon gateways 106 must be able to hear a minimum of three beacons 102, and at least one of the three beacons 102 must be on the opposite wall of the tunnel 108 relative to the other two beacons 102.

Beacons 102 are low-cost, typically battery-powered wireless transmitters that are deployed to strategic locations within a building (or mine) making it a low-cost deployment model since battery-powered beacons 102 do not require power cabling and can be simply attached to the wall 110. A beacon 102 is designed to sleep most of the time; waking up periodically (i.e., once every beacon interval) to broadcast a beacon message, containing a unique beacon ID and other information that can help a beacon gateway determine the distance from the beacon 102 to the beacon gateway 106. Beacons 102 rely on very-low power operation while asleep to extend their battery life up to several years before they need to be serviced. In general, the longer the beacon interval, the longer the battery life.

Figure 2:
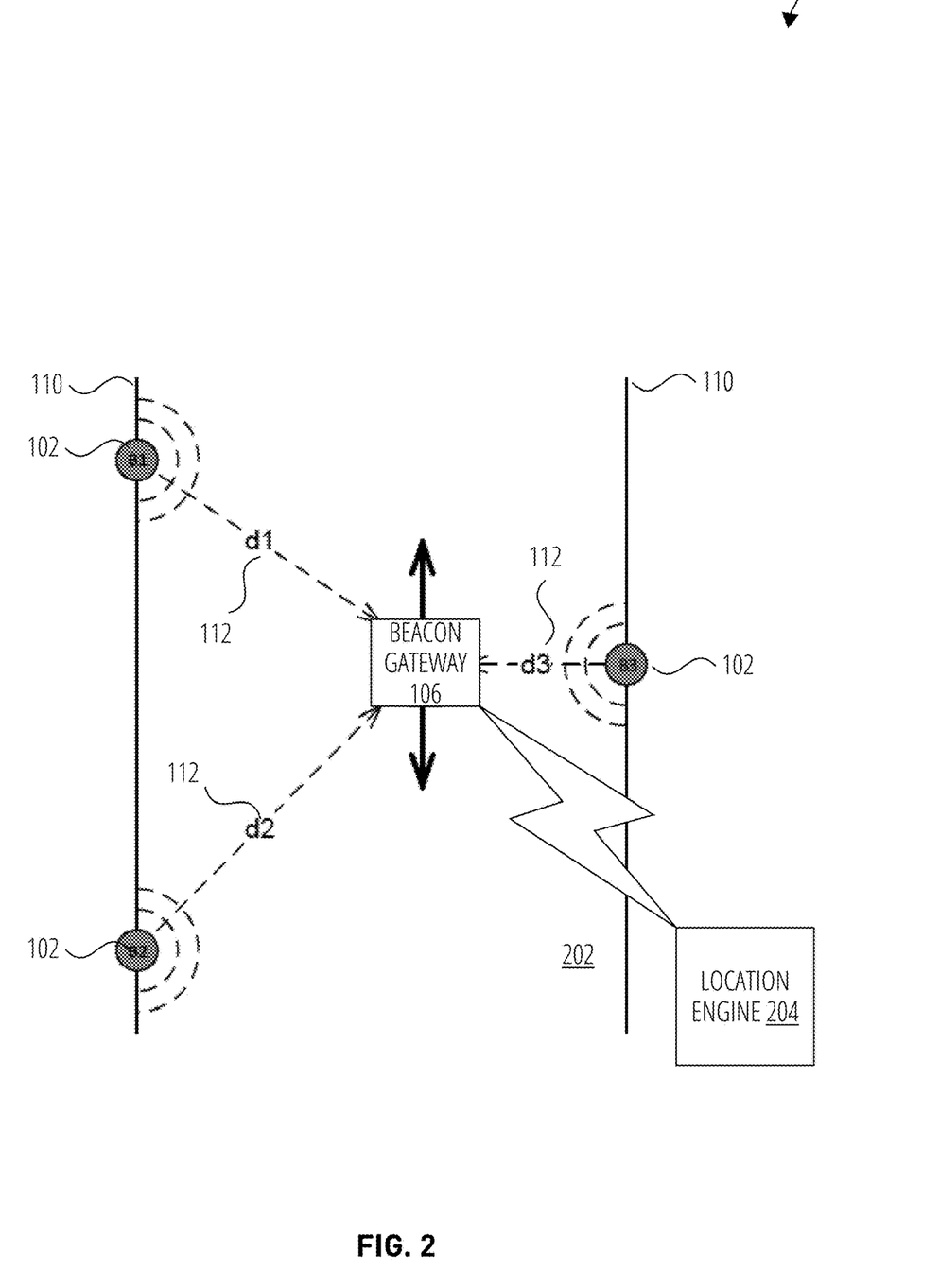
FIG. 2 illustrates a beacon communicating with the gateway and providing location information 200 in accordance with one embodiment.

Beacon gateways 106 receive messages from all beacons 102 in their vicinity. As shown in FIG. 2, a beacon gateway 106 sends beacon gateway messages to a centralized location engine 204 (LE) using a different communication channel 202. For example, beacons 102 could communicate using BLE or UWB technology, and beacon gateways 106 could be smart phones or purpose-built devices that communicate with the LE using WiFi, LTE, NB-IoT, or 5G technology. Beacon gateway messages include a unique gateway ID, and information about the beacons 102 near the gateway, such as the beacon IDs, distances 112 from the beacon gateway 106 to each of the beacons 102, and optionally, the beacon's 102 positions.

A beacon gateway 106 cannot successfully receive messages from multiple beacons 102 whose transmissions overlap in time, so a technique is used to minimize the likelihood of such collisions. For example, if a collection of beacons 102 powered up at the same time, all using the same beacon interval, all beacons 102 would transmit at the precisely the same time and beacon gateways 106 could not receive any of the messages. Collision avoidance is handled in existing beacon technologies by varying the beacon interval by adding a small random delay before sending the beacon message. By adding this random delay, beacon transmissions eventually spread out across the whole beacon interval minimizing the likelihood of collisions. Collisions will still occur from time to time as beacon transmissions drift past each other, but the probability is greatly reduced.

Figure 3:
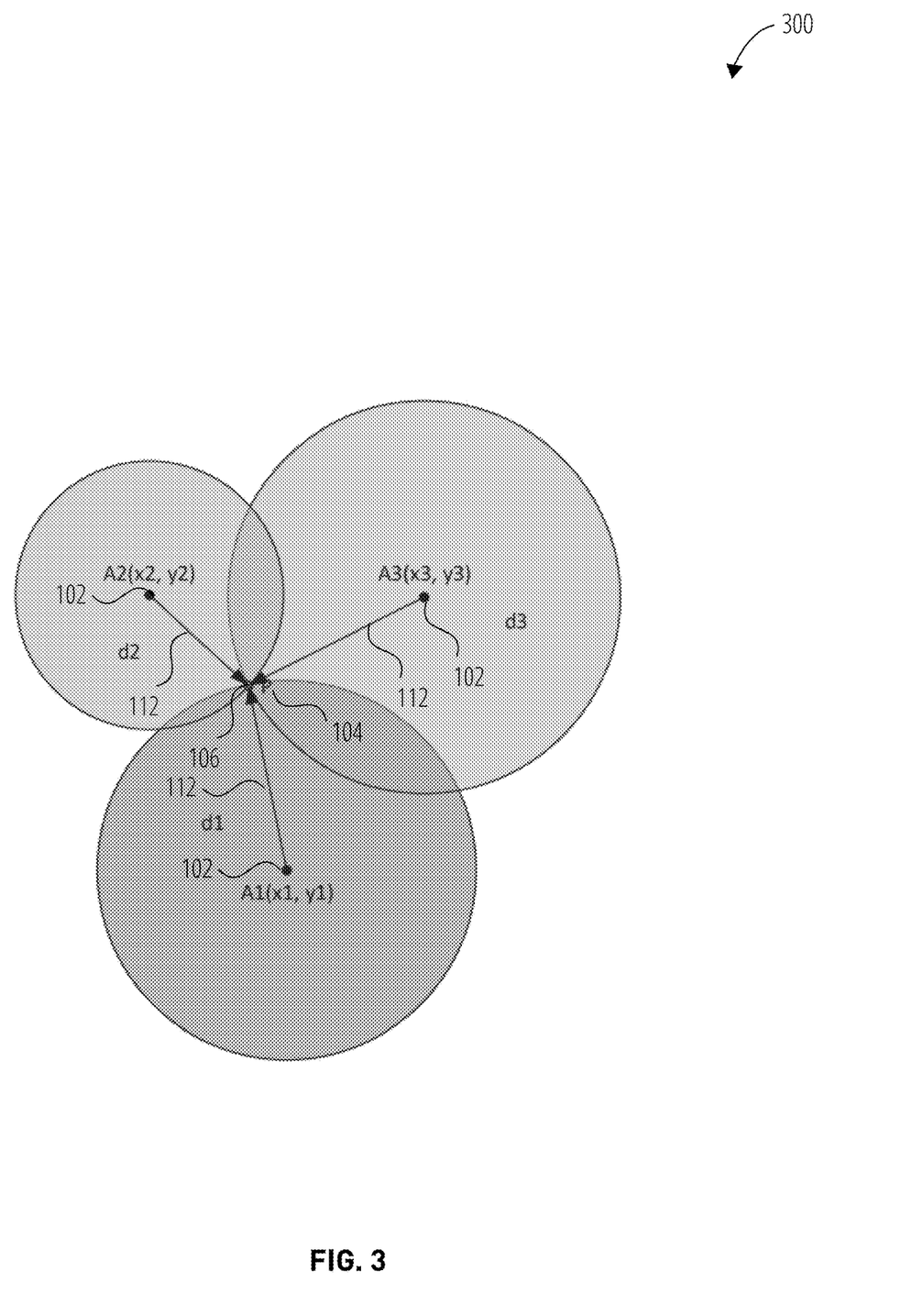
FIG. 3 illustrates a triangular multilateration algorithm used to calculate the 2D position of an asset using the positions of, and distances to three beacons 300 in accordance with one embodiment.

FIG. 2 depicts a beacon 102 communicating with the beacon gateway 106, and the beacon gateway 106 communicating with a location engine 204. The location engine 204 uses the gateway message contents, and knowledge of beacon 102 locations to calculate the location of the gateway 104 using an algorithm called triangular multilateration, as shown in FIG. 3. Using the fixed beacon 102 locations (A1, A2, A3) and distances 112 measured from the beacon gateway 106 on the asset 104 (P) to each of the beacons 102 (d1, d2, d3), the multilateration algorithm can calculate the location of the asset 104. The location of the gateway 104 is then made available to application software which can implement a variety of tracking features including, but not limited to, mapping and geofencing.

Figure 4:
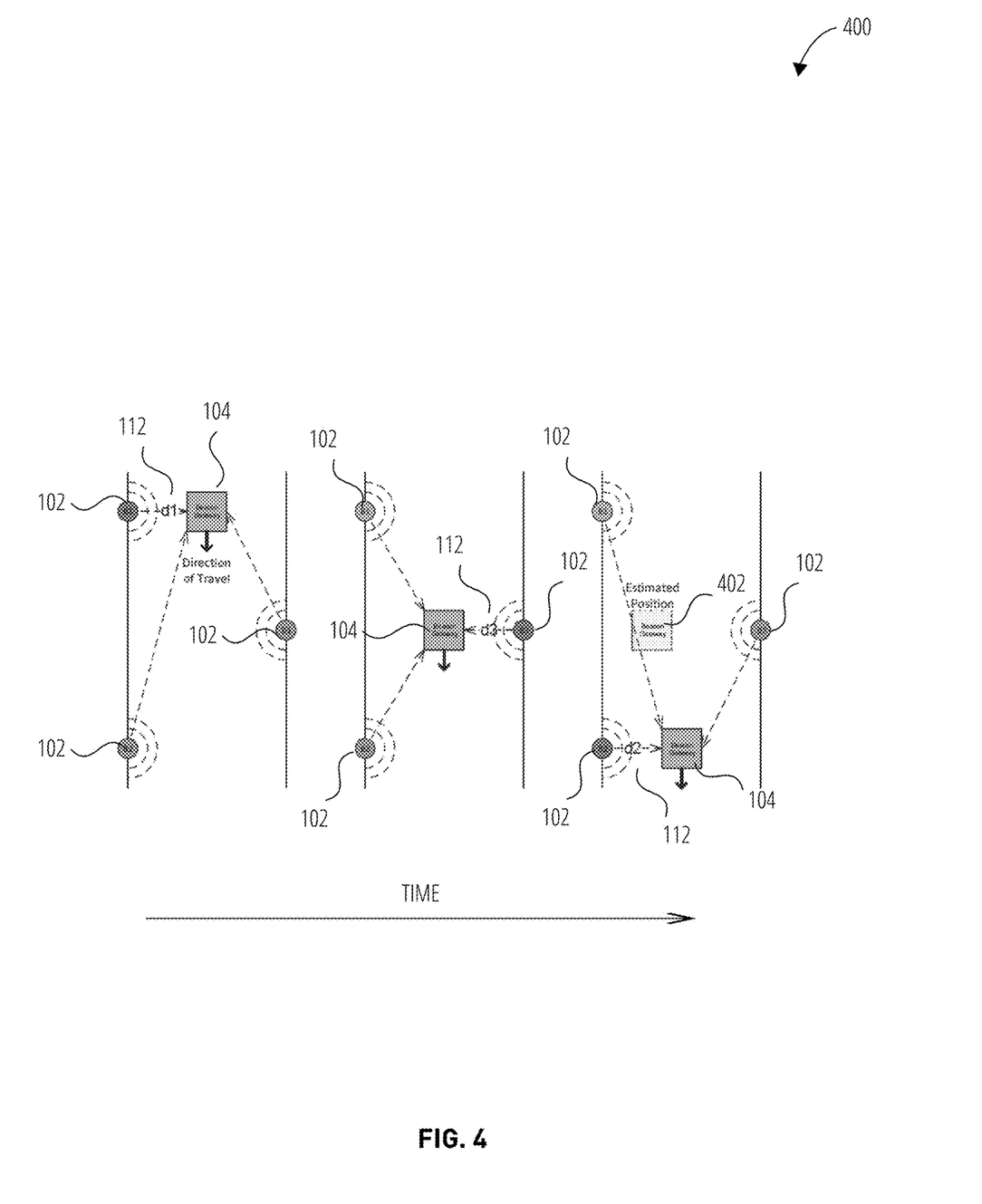
FIG. 4 illustrates an example of a fast-moving beacon asset location cannot be accurately determined because of incorrect distance measurements 400 in accordance with one embodiment.

The primary benefits of using random delays are that it is simple to implement, requires no communication between the beacons 102, and collisions are mostly avoided, but it takes an entire beacon interval to hear from enough beacons 102 to make a position calculation. If the asset 104 is moving, such as a vehicle in a mining tunnel, waiting a full beacon interval to hear from multiple beacons 102 introduces errors into the position calculation; in effect "blurring" the results as shown in FIG. 4. For the triangular multilateration algorithm to yield accurate results, the distance measurements from asset 104 to beacon 102 must be made at the same moment in time. If the asset 104 to beacon 102 distance measurements are spread out over the entire beacon interval, then the distance measurements are not at the same moment in time causing an error in the estimated position 402 calculation. An estimated position 402 is shown in FIG. 4 at an incorrect position relative to beacon 102 B2 which will result in a "blurring" effect.

In one embodiment, the beacons 102 can communicate with each other periodically, and dynamically adjust their beacon transmit timing so they send beacon messages very close in time to their closest neighboring beacons 102. With synchronized timing, fast moving beacon gateways 106 now hear all beacons 102 in their vicinity within a few milliseconds instead of needing an entire beacon interval, so distance calculations to those beacons 102 are done much closer together, and the accuracy of the position calculation is improved significantly.

Figure 5:
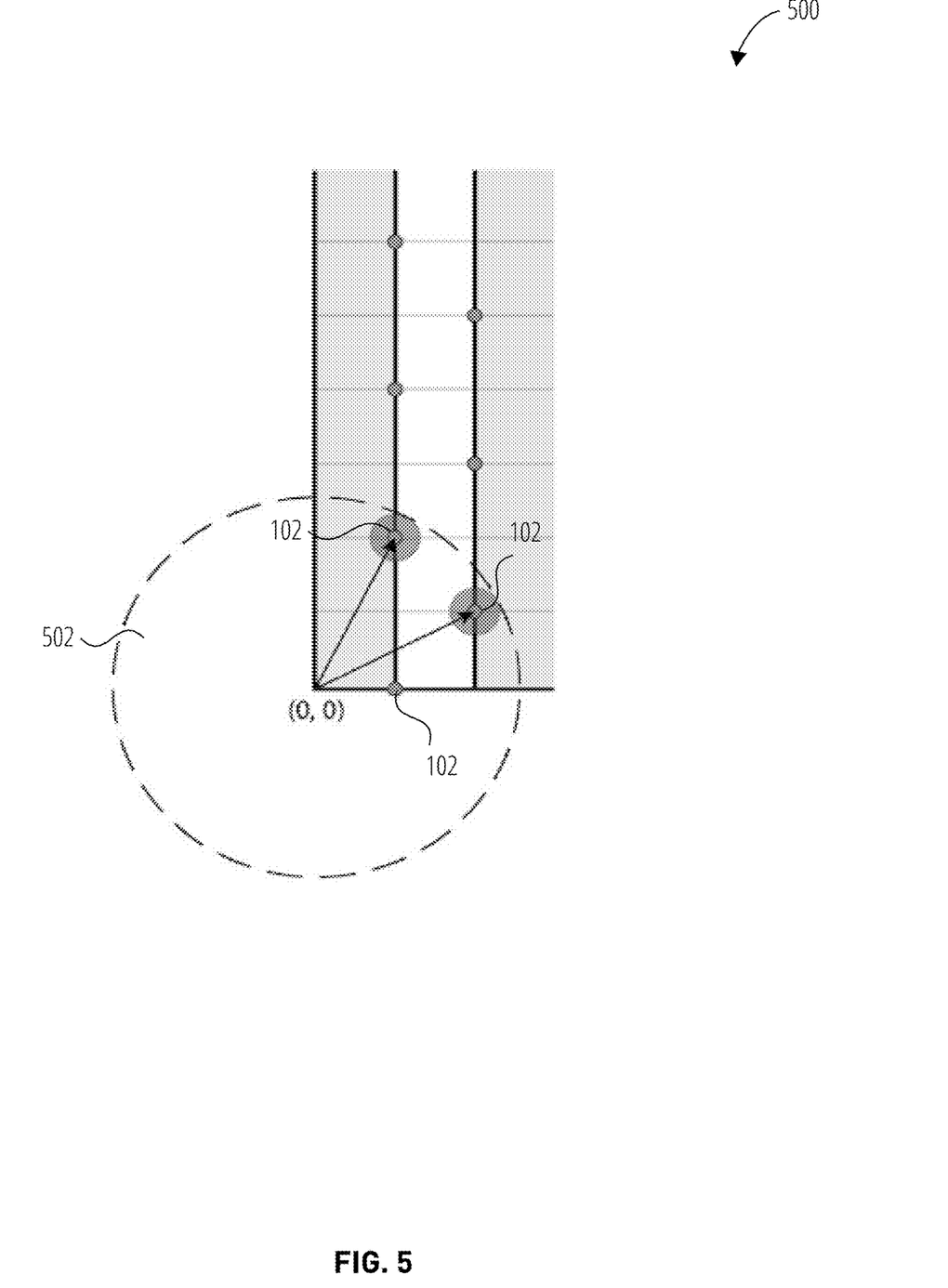
FIG. 5 illustrates an embodiment of origin capture 500 in accordance with one embodiment.

FIG. 5 depicts an embodiment of origin capture 500. The synchronization interval, which comprises a plurality of time slots, is initially filled up by the beacons 102 that are nearest to set an origin 502. This is due to an outward progression of assigning time slots for each beacon 102 from the origin 502. As you progress outwards from the origin 502, the beacons 102 with the greater distances from the origin 502 will typically obtain a later synchronization interval.

In order to begin the synchronization process, a first sensor begins transmitting and sensors within close proximity will detect the first sensor and synchronize themselves relative to it. A ripple effect of synchronization will continue, and all remaining sensors will eventually become synchronized. In some embodiments, the distance to the origin 502 may be employed for determining which sensor commences the synchronization process. In other embodiments, other beacon characteristics, such as but not limited to, ranking beacon IDs within a specified distance of the origin 502 may be employed in determining the first sensor election mechanism.

After all beacons 102 are synchronized, the relative timing between neighboring beacons 102 may drift over time due to imprecision in the crystal oscillators used in the sensors, this could take from hours to months depending on several factors such as, but not limited to, frequency errors depending on the type of crystal, temperature, aging. This issue may be addressed each sensor making slight timing adjustments periodically relative to its neighbors.

Figure 6:
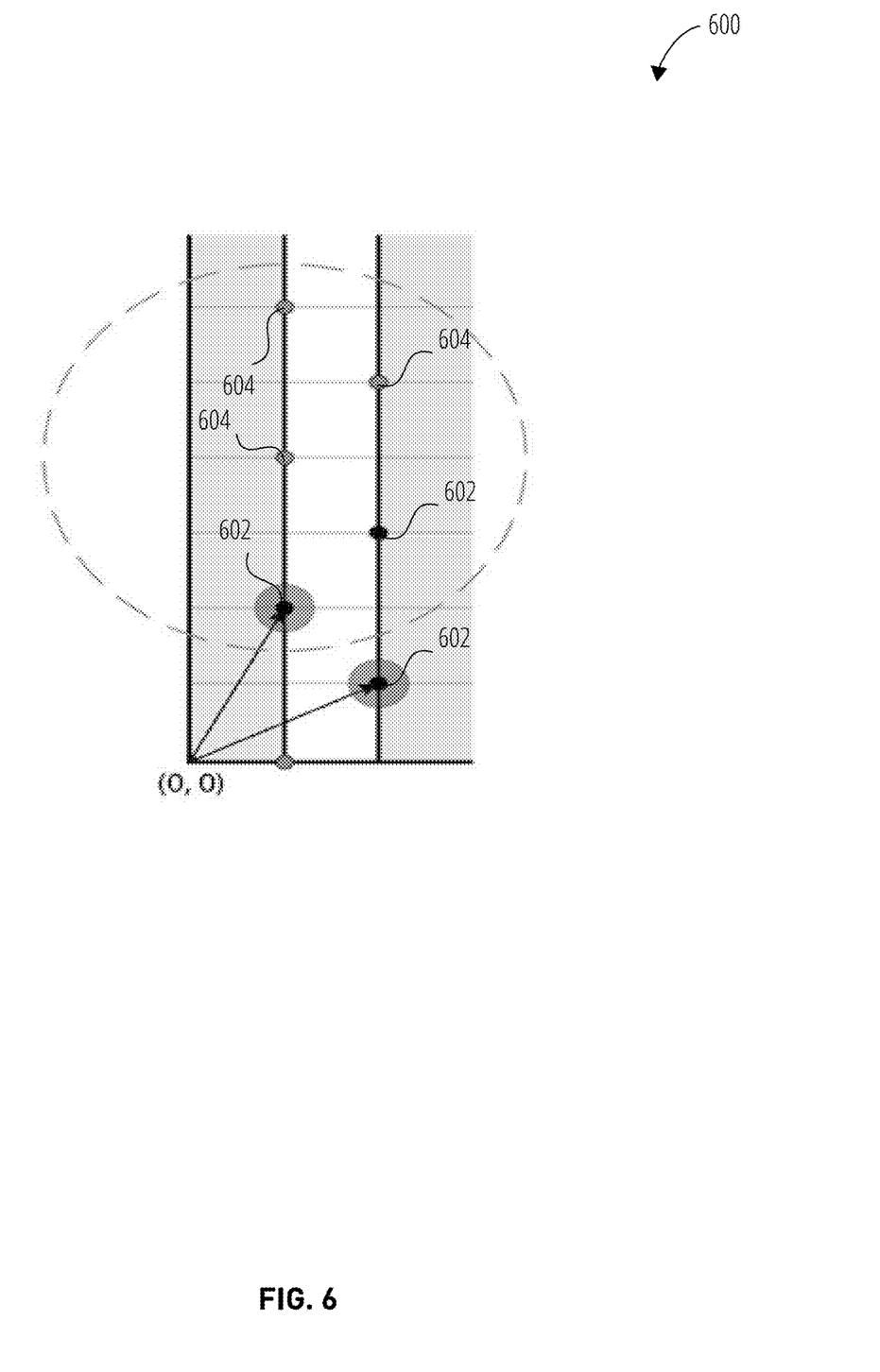
FIG. 6 illustrates an example of beacon communication 600 in accordance with one embodiment.

Beacons 102 typically only hear a subset of the beacons 102 that comprise the entire beacon network. In FIG. 6, this is represented as the dotted circle. Beacons 102 start in the "unsynchronized" state where they listen for messages from neighboring beacons 102. Unsynchronized beacons 102 typically do not transmit anything. Beacons 102 know their own positions, so they can calculate their respective distances from the origin and, can convert these distances into "preferred" time slots.

FIG. 6, shows the progression of time slot allocations based on the communication from synchronized beacons 602 to unsynchronized beacons 604. When a synchronized beacon 602 communicates with one or more unsynchronized beacons 604, the synchronized beacons 602 transmit information such as their unique beacon identification number, their coordinates and their chosen time slots. The unsynchronized beacon 604 must choose a time slot that is different from all neighboring beacons 102. There are situations where an unsynchronized beacon 604 is unable to choose its "preferred" time slot because another neighboring beacon 102 may already be using that time slot. In this situations, unsynchronized beacon must choose any available time slot that is close as possible to its "preferred" time slot. Once a beacon 102 has chosen a time slot, it becomes a "synchronized" beacon 102 and starts transmitting in that time slot to nearby beacons 102.

Figure 7:
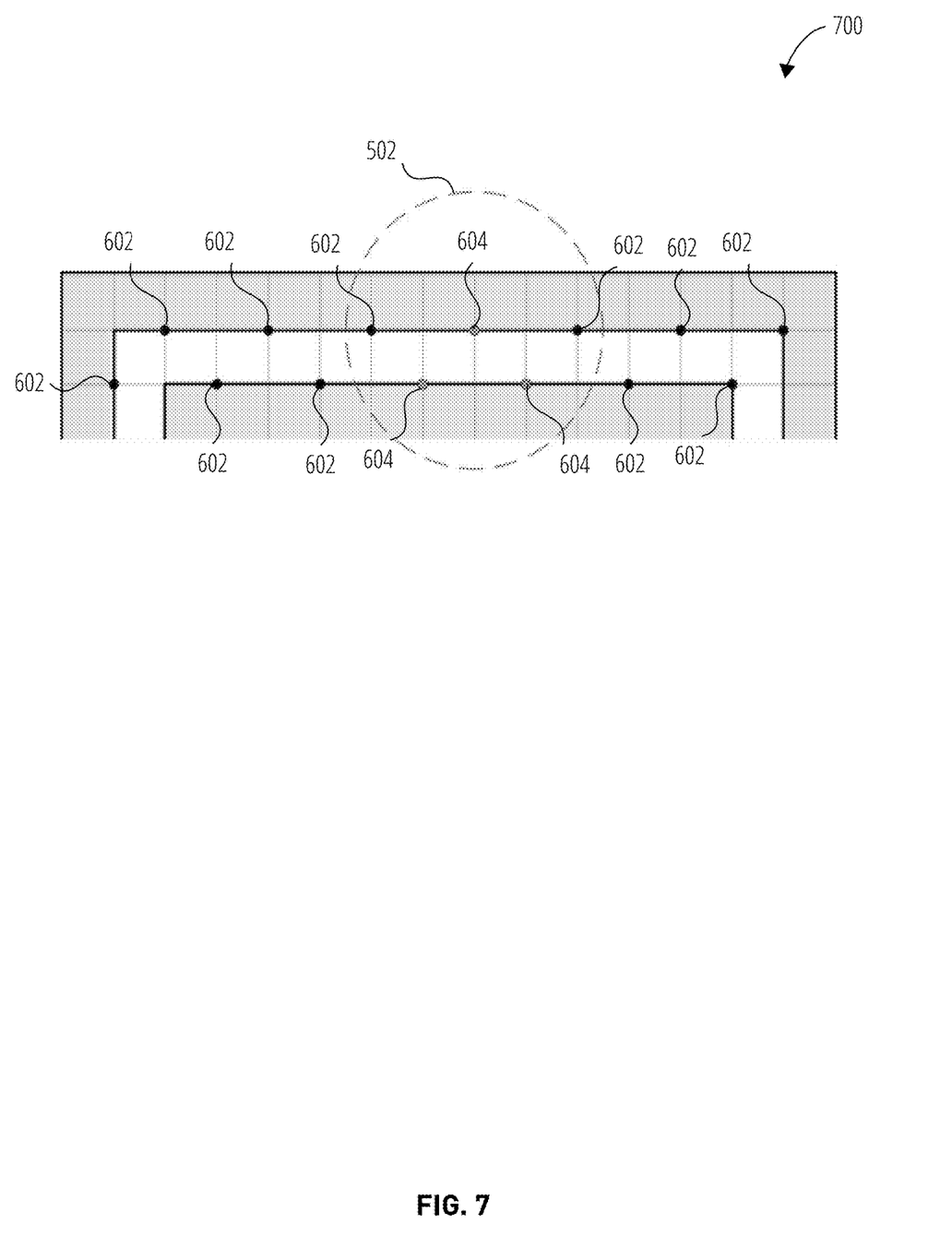
FIG. 7 illustrates an example multidirectional beacon assignment progression 700 in accordance with one embodiment.

In some circumstances, the progression of time slot allocation may result in some synchronized beacons 602 obtaining an earlier time slot as compared to unsynchronized beacons 604 that are closer in distance to the origin 502, such as example of multidirectional beacon assignment progression 700 is shown in FIG. 7. This circumstance is due to their relative position in the time slot allocation progression.

If two or more beacons 102 are at the same distance away from the origin 502 but are located at two separate points in space, or are close enough to the same distance away from the origin 502 that they map to the same "preferred" time slot, this will result in a time slot collision that must be resolved between the beacons 102. Since the beacons 102 are given unique identification numbers and coordinates, these may be employed in this circumstance to determine which beacon 102 gets to use its "preferred" time slot and which beacons 102 need to find alternative time slots close to their preferred ones.

Similarly, if two or more beacons 102 are at the same distance away from the origin 502 but are far enough away from one another that they are unable to communicate between themselves, they may assume the same "preferred" time slot since collision potential is not a concern.

The embodiments are described above in the context of mining and mining tunnels but are applicable to any beacon networks configurations. The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A self-synchronization sensor system for tracking fast moving assets comprising:
   a plurality of beacons with known coordinates in a tunnel communicating with said plurality of beacons periodically during a synchronization interval and adjusting a beacon interval for each of said plurality of beacons such that one or more beacon messages are transmitted in short time intervals to said plurality of beacons in close proximity;
   said synchronization interval comprising a plurality of time slots;
   a first beacon from said plurality of beacons assigned a first time slot from said plurality of time slots within said synchronization interval and launches an origin; and
   a progression of time slot allocation of said plurality of time slots from said origin based on said communication between said plurality of beacons.

2. The system of claim 1, wherein said plurality of beacons are organized in a 2D triangular pattern.

3. The system of claim 1, wherein said plurality of beacons are organized in a 2D rectangular pattern.

4. The system of claim 1, wherein said plurality of beacons are organized in a 2D irregular pattern.

5. The system of claim 1, wherein said plurality of beacons are organized in a 3D pattern.

6. The system of claim 1, wherein said plurality of beacons communicate assignment status.

7. The system of claim 1, wherein said plurality of beacons communicate a unique identification number.

8. The system of claim 1, wherein said plurality of beacons communicate coordinates.

9. The system of claim 1, wherein said plurality of beacons communicate one or more statuses of said plurality of time slots.

10. The system of claim 1, wherein two or more of said plurality of beacons may assume a same time slot if collision potential is determined to not be of concern.

11. The system of claim 1, wherein said synchronization interval assigns said plurality of time slots based on a proximity of one or more of said plurality of beacons to said origin.

12. The system of claim 11, wherein said assignment of said plurality of time slots progresses outward from said origin.

* * * * *